Sept. 7, 1965  L. D. ADCOX  3,204,765
SORTING MACHINE FOR POTATOES AND THE LIKE
Filed Dec. 30, 1963  9 Sheets-Sheet 1

INVENTOR.
L. D. ADCOX
BY Wells & St. John
ATTYS.

Sept. 7, 1965 L. D. ADCOX 3,204,765
SORTING MACHINE FOR POTATOES AND THE LIKE
Filed Dec. 30, 1963 9 Sheets-Sheet 9

INVENTOR.
L. D. ADCOX
BY
ATTYS.

United States Patent Office 3,204,765
Patented Sept. 7, 1965

3,204,765
SORTING MACHINE FOR POTATOES AND
THE LIKE
L. D. Adcox, 714 4th Ave., Quincy, Wash.
Filed Dec. 30, 1963, Ser. No. 334,187
6 Claims. (Cl. 209—82)

My invention relates to machines for sorting various sizes and shapes of produce, such as potatoes. It is the purpose of my invention to provide an improved machine capable of receiving a flow of articles of produce from a conveyor on which the articles of various sizes and shapes are mingled together and capable of separating the articles into several groups according to size and shape and directing them into separate containers, holding back those above a predetermined maximum size and carrying over those below a predetermined minimum size.

My invention is embodied in a machine having two in-feed hoppers that receive produce articles, such as potatoes, from a conveyor belt. These hoppers have belt conveyors at the bottoms thereof which redirect the articles to elevating conveyors which carry the produce articles upward on fingers to eliminate dirt and small trash. These elevating conveyors deliver the articles onto spacing and aligning cone assemblies where the articles are guided by yielding barriers toward the centers of the cones to slow down their travel and then allowed to move outwardly and downwardly along the cone surfaces as the cones rotate. The effect of this handling is to space the articles and to cause them to be positioned with their longest dimensions in the direction of travel. The machine has a conveyor for each cone receiving the articles from the cone and carrying them past a plurality of photo-electric scanning devices, the first of which is so constructed that it will detect overly large articles and will detect two or three articles attempting to go past in overlapped relation with each other. This scanning device actuates an article removing device that is positioned above the hopper so as to return the articles removed from the conveyor to its corresponding hopper. The other scanning devices are arranged one after the other alongside each conveyor and each such device controls an article removing device that is positioned to remove its selected article from the conveyor. A cross conveyor runs beneath each pair of removing devices for each size article and it can be run in either direction to deliver the selected articles to the right or the left. The machine has a box supporting platform at one end of each cross conveyor, and a sack holding support at the other end thereof.

One particular object of the invention is to provide a sorting machine for potatoes with a cone and barrier assembly adapted to align the potatoes with their long axes in line and simultaneously to speed up their travel to effect a spacing of one from the next.

It is also the purpose of my invention to provide such a machine with a conveyor receiving the potatoes from the cone and barrier assembly and a detecting device operable to detect any failure of the cone and barrier assembly to separate the potatoes and to effect a separation thereof so that the selectors for size may operate successfully.

In the present day marketing of potatoes the demand of the user is for potatoes of uniform size. The packing of potatoes therefore must segregate the potatoes accordingly. The potatoes are packed in cartons or boxes which contain, when full, a certain quantity of potatoes varying only by one or two potatoes in a box. Thus the buyer can select boxes containing 72 potatoes, 76 potatoes or 80 potatoes for example, and be assured of getting that many. In the restaurant trade this uniformity of size is particularly important for potatoes of like size bake in about the same time. My invention is particularly useful in the selecting of and packaging of potatoes for this market, although it has application wherever produce articles of various random sizes must be segregated according to size and shape.

The nature and advantages of my invention will appear more fully from the following description and the accompanying drawings illustrating a preferred form of the invention. The drawings and description are intended to be illustrative only and should not be considered as limiting the scope of the invention except insofar as that scope is limited by the claims.

Referring now to the drawings, the machine embodies an in-feed conveyor at 1 which brings the articles to be sorted from any suitable source to the machine. The conveyor 1 extends over two hoppers 2 and 3 where the inclined walls 2a and 3a of these hoppers meet. The articles fall from the conveyor 1 upon a soft pad 4 of sponge rubber or the like. The hoppers 2 and 3 are supported upon a frame 5 which also supports other parts of the machine. The hoppers 2 and 3 have belt conveyors 6 and 7 respectively in the bottoms of the hoppers. The belts 6 and 7 deliver the articles to elevating conveyors 8 and 9 which have fingers 8a and 9a arranged to pick up the articles and to allow fine materials to fall down to the floor. The conveyors 8 and 9 are within housings 8b and 9b which extend upwardly above the level of the conveyor 1.

In front of the housings 8b and 9b are two article spacing and aligning assemblies 10 and 11. The housings 8b and 9b have spouts 12 and 13 which extend down into the assemblies 10 and 11 to deliver the elevated articles from the conveyors 8 and 9 to the assemblies. The assemblies 10 and 11 are right and left hand images of each other. They embody shells 14 and 15 mounted on the frame 5. Within the shells there are rotating cones 16 and 17 respectively. The shells 14 and 15 support resilient barriers 18 and 19 which extend upwardly from the surfaces of the cones 16 and 17 and which are eccentric with respect to the cones 16 and 17, the barriers being cut along their lower edges to clear the cones for rotation.

The barriers 18 and 19 are thin strips of resilient material. They are hung on the shells 14 and 15 by a multiplicity of springs 20 which are affixed to the barriers 18 and 19 and adjustably mounted on the shells 14 and 15 by bolts 21. This enables the barriers to move slightly and adjust to the varying impacts of articles that are being delivered through the spouts 12 and 13 onto the cones 16 and 17. The springs 20 and bolts 21 provide means to initially position the barriers with respect to the cones.

Figure 8:
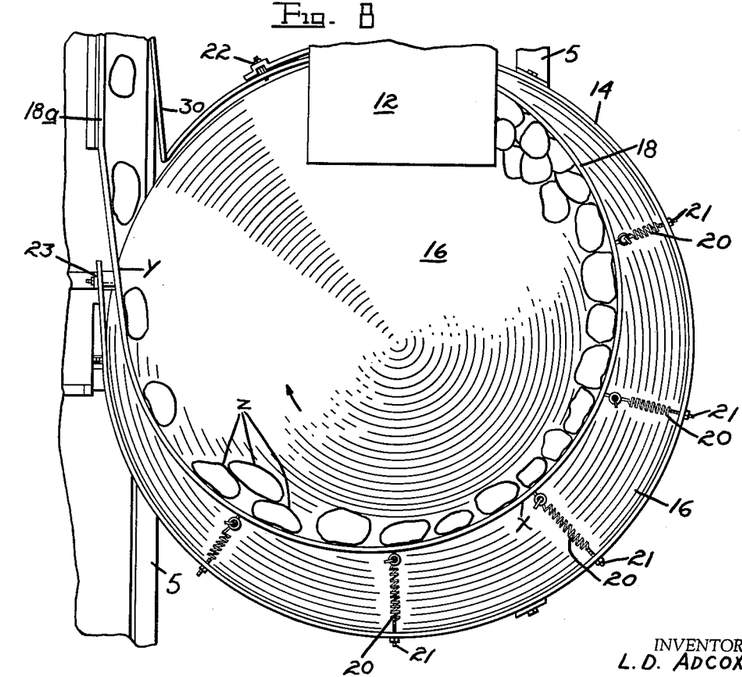
FIGURE 8 is an enlarged fragmentary plan view of one of the assemblies for spacing and aligning the potatoes.
Figure 9:
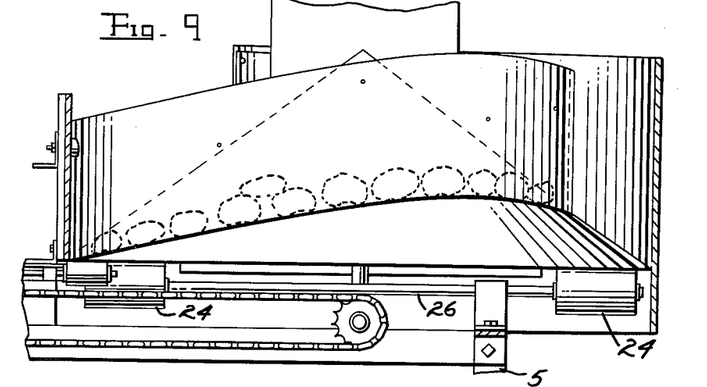
FIGURE 9 is a view looking at FIGURE 8 from the left side, with the outer shell broken away.

The function of the assembly 10 is illustrated somewhat is FIGURES 8 and 9. The articles (potatoes) are shown piled up on the cone surface as they move out from beneath the spout 12. In their initial advance they are caused to climb the cone surface because the barrier approaches closer to the central axis of the cone for about a third of the cone circumference (to about the point X in FIGURE 8 of the drawings). Beyond this point X the barrier 18 recedes gradually from the central axis of the cone 16 until it passes beyond the outside edge of the cone 16 at Y in FIGURE 8 of the drawings. The articles are, because of their tendency to roll on the inclined cone surface in order to reach the upright surface of the barrier, made to assume a position with their greatest axis extending in the direction of travel of the cone. Occasionally a trio of potatoes may get past the point X in overlapped position as shown at Z in FIGURE 8. Whenever this occurs these three articles may leave the cone still overlapped. This is rare, however, and the machine provides means to separate them later.

It will be noted that the barrier 18 is bolted to the shell 14 at 22 and at 23 (FIG. 8). The cones 16 and 17 are supported beneath the spouts 12 and 13 by rollers 24 and 25. The rollers 24 appear in FIGURE 9 and the rollers 25 appear in FIGURE 11. The axles 26 and 27 that carry these rollers are supported on the frame.

The barriers 18 and 19 continue as members 18a and 19a beyond their respective cones 16 and 17 from a point indicated at Y in FIGURE 8 and form side guides alongside belt conveyors 28 and 29. The other side guides for the conveyors 28 and 29 are indicated at 30 and 31.

Figure 10:
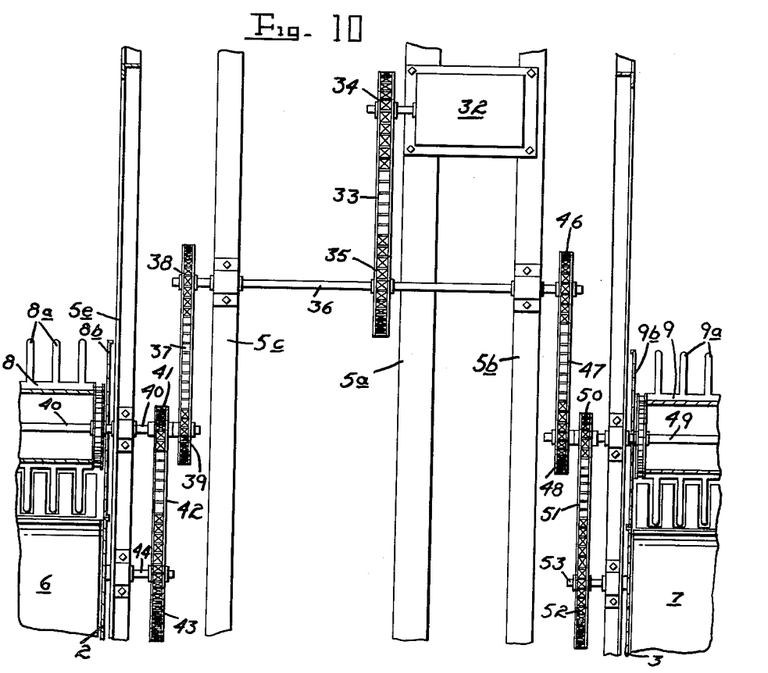
FIGURE 10 is an enlarged sectional view taken on the line 10—10 of FIGURE 3.

Referring now to FIGURES 2, 3, 10 and 11, the drive means for the conveyors 6, 7, 8 and 9 comprises a motor 32 mounted on frame members 5a and 5b (FIG. 10). This motor is connected by a chain 33 and sprocket wheels 34 and 35 to a cross shaft 36 which is supported on frame members 5b and 5c. One end of the shaft 36 is connected by a chain 37 and sprocket wheels 38 and 39 to a shaft 40. The shaft 40 is supported by frame members 5d and 5e. The shaft 40 drives the elevating conveyor 8. It also has a sprocket wheel 41 thereon which drives a chain 42 that drives a sprocket wheel 43 on a shaft 44 which is the drive shaft for a roller 45 that carries the conveyor 6.

The shaft 36 also drives the conveyors 7 and 9. This drive comprises a sprocket wheel 46 on the shaft 36, a chain 47, a sprocket wheel 48 on a drive shaft 49 for the elevating conveyor 9, a second sprocket wheel 50 on the shaft 49, a chain 51, a sprocket wheel 52 on a drive shaft 53 for a roller 54 that carries the conveyor 7. Frame members 5f and 5g carry the shafts 49 and 53.

Figure 2:
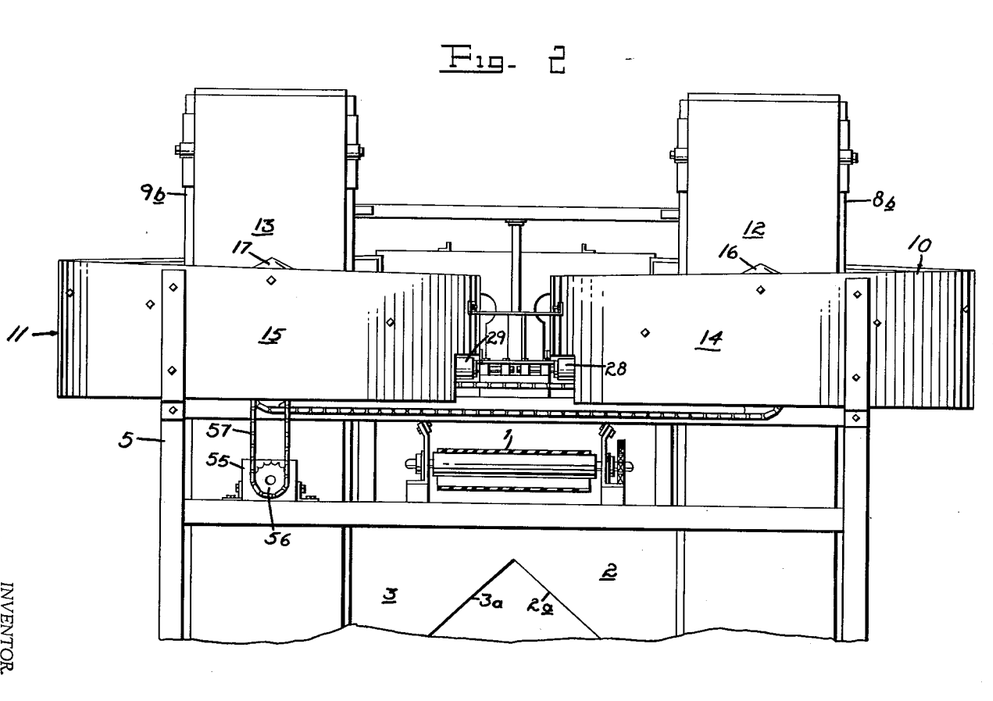
FIGURE 2 is a front end view of the machine on a larger scale.
Figure 3:
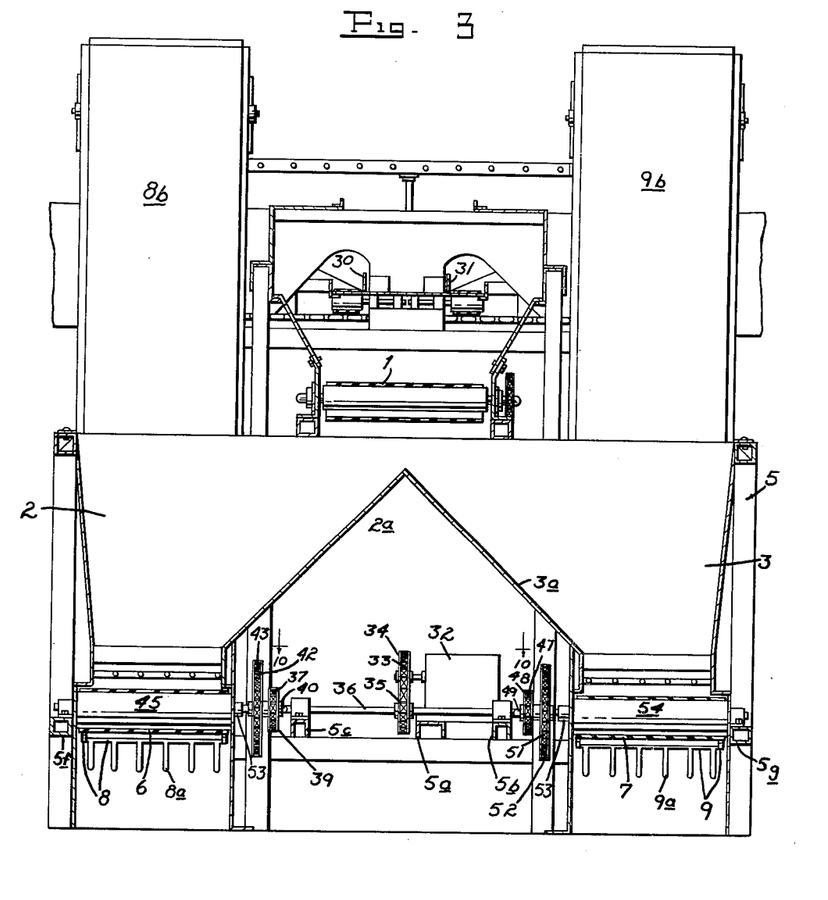
FIGURE 3 is an enlarged sectional view taken on the line 3—3 of FIGURE 1.
Figure 5:
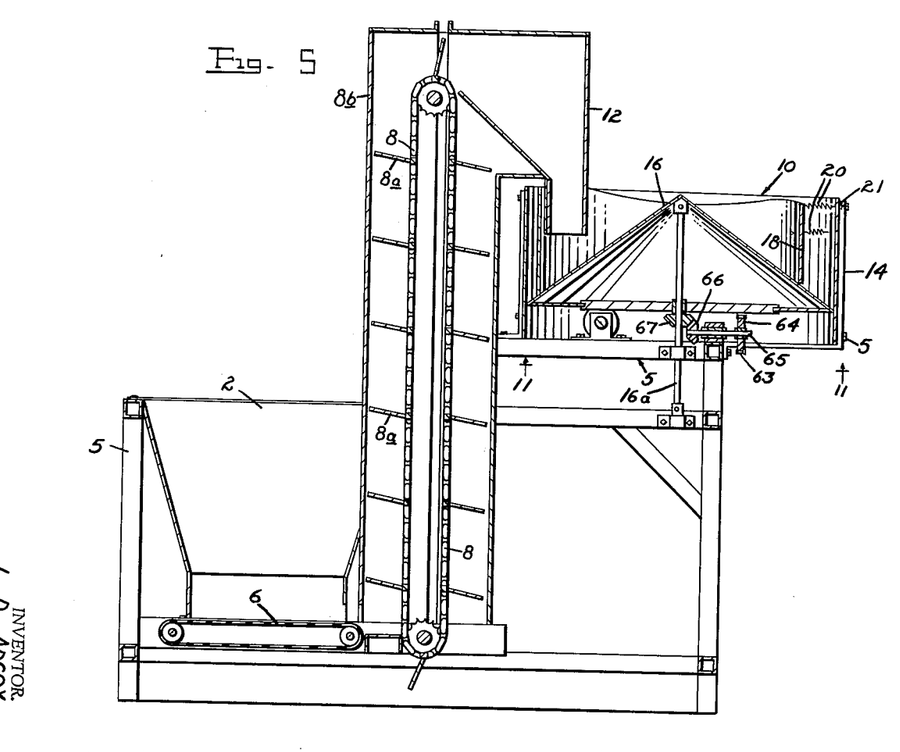
FIGURE 5 is an enlarged sectional view taken on the line 5—5 of FIGURE 1.
Figure 11:
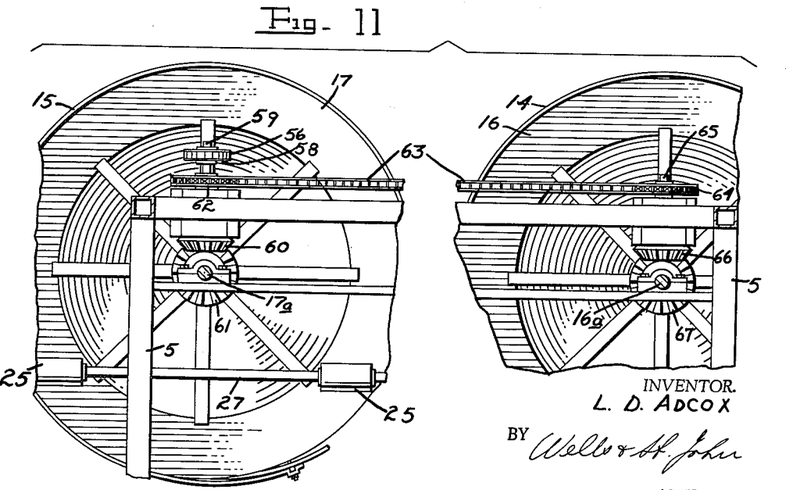
FIGURE 11 is a fragmentary sectional view looking up at FIGURE 5 from the line 11—11.
Figure 12:
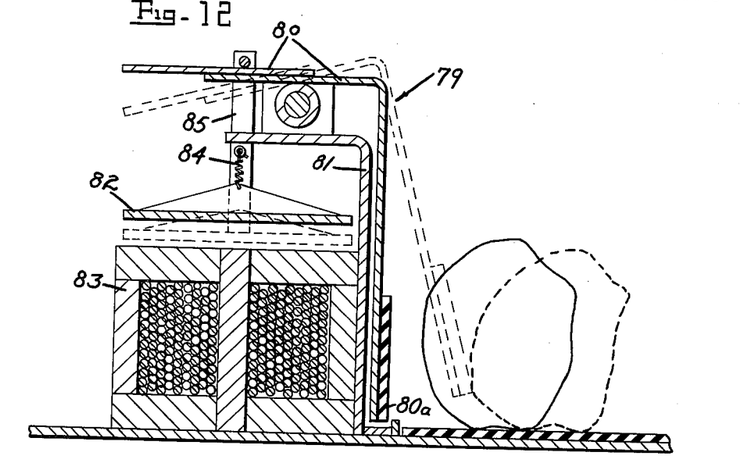
FIGURE 12 is an enlarged sectional view through one of the article removing devices that is used to remove the articles from the sorting belts.

The drive for the cones 16 and 17 (FIGURES 2, 5 and 11) is from a motor 55 on the frame 5. This motor has a drive sprocket wheel 56 driving a chain 57 (FIGURES 2 and 11). The chain 57 drives a sprocket wheel 58 on a horizontal shaft 59 just below the cone 17. The shaft 59 carries a bevelled gear 60 which meshes with a bevelled gear 61 on the shaft 17a of the cone 17. The shaft 17a is mounted for rotation on the frame 5 and is fixed to the cone 17. In order to drive the cone 16, a sprocket wheel 62 fixed on the shaft 59 drives a chain 63 that extends across to a sprocket wheel 64 on a shaft 65 that carries a bevelled gear 66. The gear 66 meshes with a bevelled gear 67 on the shaft 16a of the cone 16.

The conveyors 28 and 29 extend over the hoppers 2 and 3 and rearwardly alongside a series of photo-electrically controlled selector stations indicated at 68, 69, 70, 71, 72 and 73. Each selector station comprises a photo-electric cell unit 74 for the conveyor 28 and a like unit 75 for the conveyor 29. These units are between the conveyors. Across the belt 28 from each unit 74 there is a light source 76, and across the belt 29 from each unit 75 there is a light source 77. Each light source directs its light across the belt to the corresponding photo-electric cell unit in the known manner. These cell units have housings 74a and 75a apertured with small apertures defining a pattern of predetermined size and shape. These patterns may vary greatly depending upon the articles to be sorted.

Figures 4, 14:
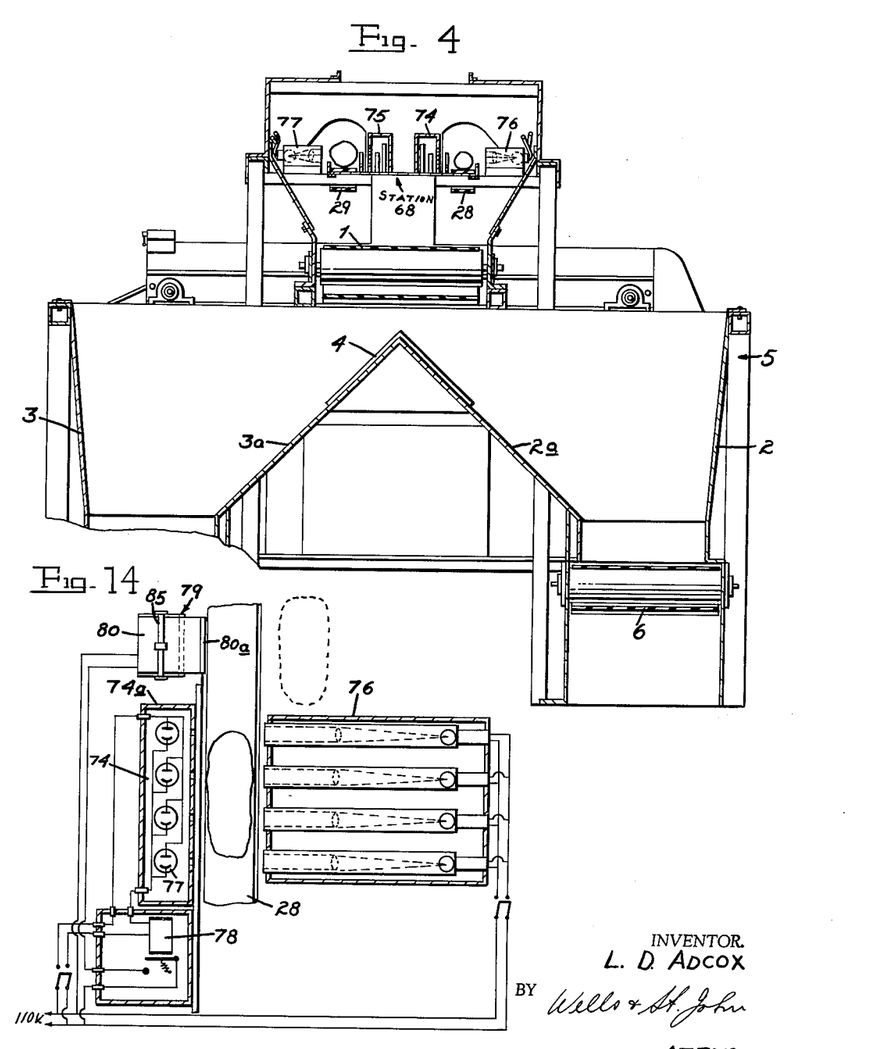
FIGURE 4 is an enlarged sectional view taken on the line 4—4 of FIGURE 1.
FIGURE 14 is a diagrammatic view showing how the detecting means is arranged.

As shown in FIGURE 4 and FIGURE 14, the articles (potatoes) move on the conveyor 28 in front of the unit 74 intersecting the light from the source 76. If the potato is large enough to momentarily block light from the entire pattern of apertures in the housing 74a, then the unit 74 will be deprived of the light necessary to make its cells carry current to energize a relay 78. The relay 78 has its armature connected in an energizing circuit for an article removing device 79. The device 79 (FIGURE 13) embodies a padded L-shaped pusher member 80 that is pivoted on a support 81. This support extends over a solenoid armature 82 which is attracted by the electromagnet 83 of the solenoid which is energized when the relay 78 is de-energized. The armature 82 is suspended from the support 81 by a spring 84. It carries a bail 85 that pulls down on the member 80 when the armature 82 is attracted to the electromagnet 83. This causes the padded portion 80a to swing out against an article on the belt 28 to push it off the conveyor. The action of the member 80 is synchronized with the travel of the belt 28 so as to engage the potato shortly after it clears the photo cell. The spring 84 retracts the armature 82 and returns the pusher member 80 to inactive position as soon as the solenoid electromagnet 83 is de-energized.

The conveyor 29 has an article removing device 86 for each of the photo-cell units 75 which is controlled in the same manner as the device 79. These particular photo-cell selector devices are, however, examples only and may be varied considerably. There are other known photo-cell devices such as are shown in U.S. Patents No. 2,433,946, No. 2,675,917, No. 2,085,671, and No. 3,052,-353 which operate to indicate the sizes of various articles.

According to my invention, the article removing devices 79 and 86 for each of the stations 68, 69, 70, 71, 72 and 73 are arranged opposite to each other and they deflect the articles off the respective conveyors 28 and 29 so that a single receiver below the conveyors 28 and 29 may receive articles from both conveyors at a given station.

The station 68 has its devices 79 and 86 positioned above the hoppers 2 and 3 so as to direct articles removed thereby into the respective hoppers. The purpose of this is two-fold. In the first place, if by any chance two or more potatoes do manage to get past either of the segregating cones 16 or 17 in overlapped or non-spaced relation, this station 68 will have its device 79 or 86 activated to deflect at least one of such potatoes into the hopper. Secondly, if an exceptionally large "jumbo" potato is allowed to get on to one of the belts 28 or 29, it will be deflected into one of the hoppers 2 or 3 and can be removed manually or otherwise from the hoppers 2 and 3.

Figure 6:
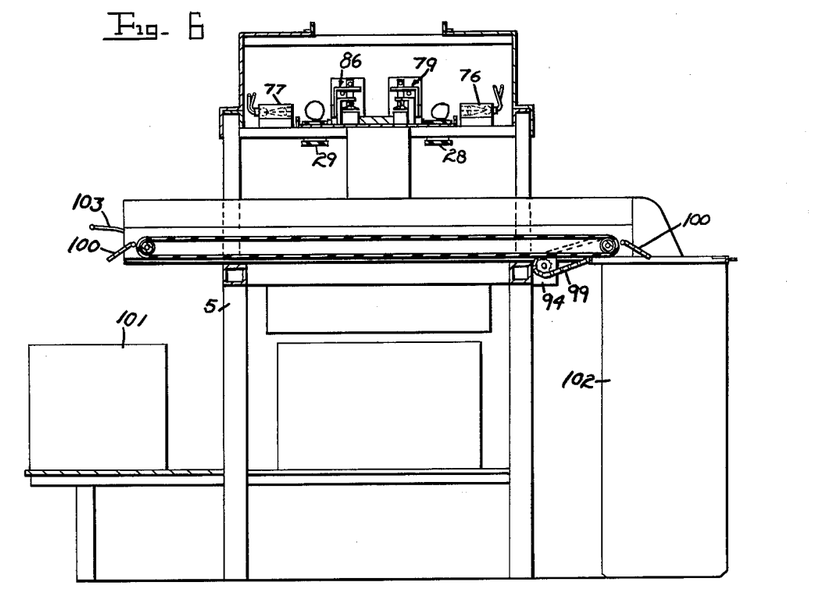
FIGURE 6 is an enlarged sectional view taken on the line 6—6 of FIGURE 1.
Figure 7:
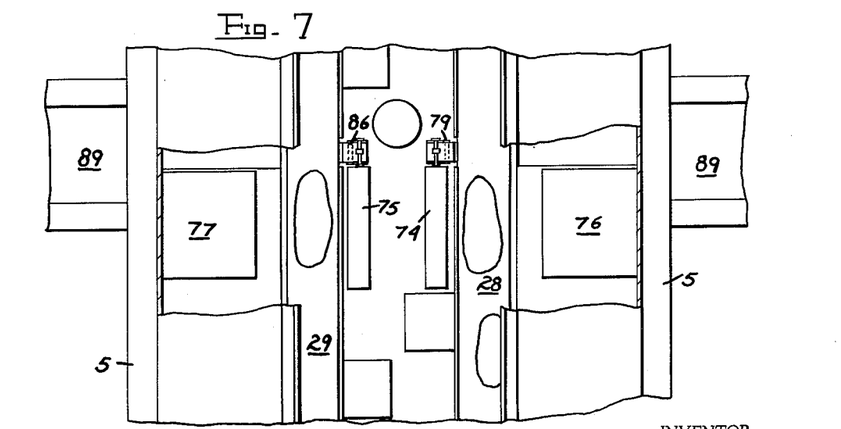
FIGURE 7 is a fragmentary plan view on an enlarged scale looking down on FIGURE 6 with parts broken away.

The other stations 69, 70, 71, 72 and 73 have cross conveyors 89, 90, 91, 92 and 93 extending transversely beneath them and supported on the main frame of the machine. These cross conveyors are individually driven by reversible motor units 94, 95, 96, 97 and 98. Each motor unit is connected to its respective conveyor by a drive chain 99 (FIGURE 6).

Figure 13:
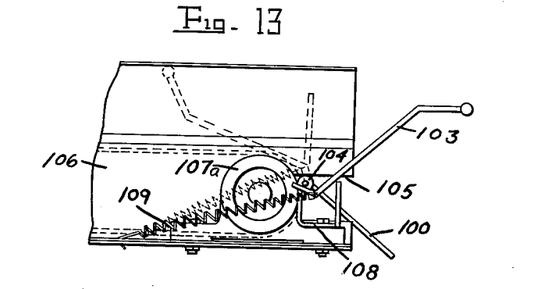
FIGURE 13 is an enlarged fragmentary side view of a part of the cross conveyor structure showing a manually operable barrier that is used to stop the delivery of potatoes from the conveyor while a new container is inserted.
Figure 15:
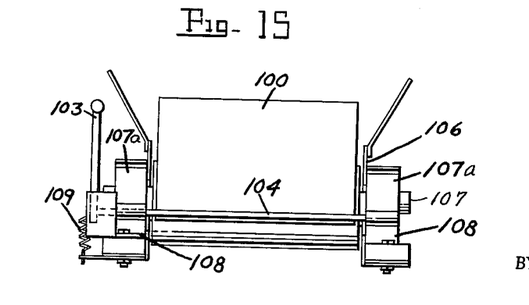
FIGURE 15 is an end view of the cross conveyor looking at FIGURE 13 from the right.

Each of the conveyors 89-93 is provided with manually controlled barriers 100 at each end adapted to hold back the discharge of articles from them while the containers shown at 101 and 102 are replaced. These barriers 100 are controlled by hand levers 103. As shown in FIGURES 13 and 15 the barrier 100 is affixed to a rock shaft 104 which extends through slots 105 in the side walls of the frame 106 of each of the conveyors 89–93. These same slots receive the shaft 107 for the conveyor. The ends of shaft 107 are carried in bearing blocks 107a. A bracket 108 mounted on each block 107a provides a pivotal support for rock shaft 104. The shaft 104 has the hand lever 103 affixed to it outside the bracket 108 and an over center spring 109 connected to the hand lever and to the frame 106 keeps the barrier either in raised position to hold back the articles on the conveyor or in lowered position where the articles pass over it.

Any articles that are too small to be selected by any of the several photo-cell selector units will remain on the belts 28 and 29 to their discharge ends where they are delivered to a divided spout 110 to direct all of the small articles into a receptacle 111. These spouts are well known and it is believed further description thereof would be superfluous.

Figure 1:
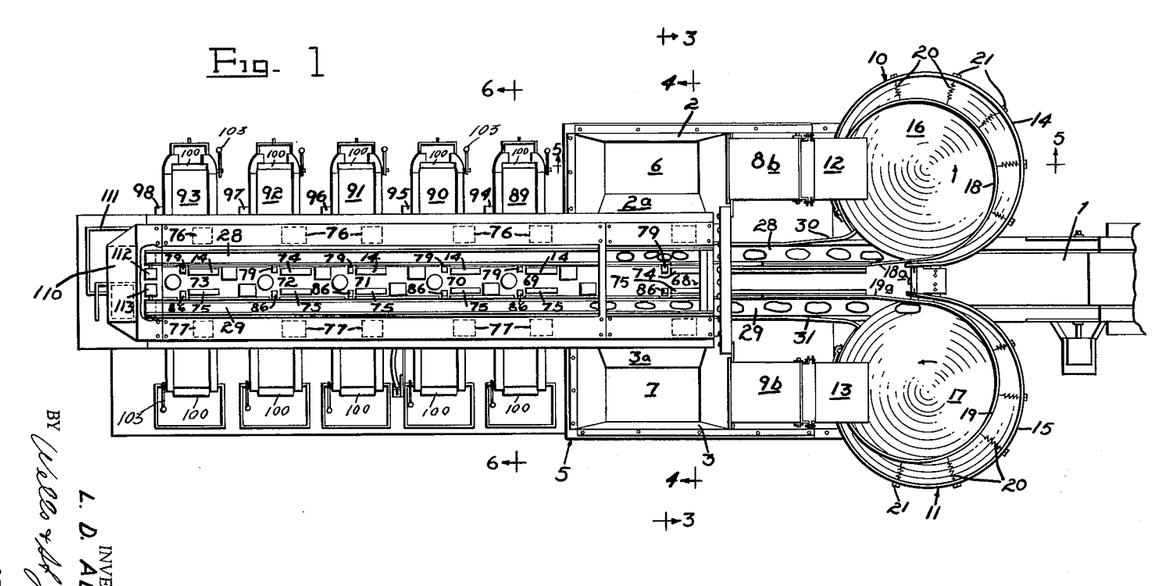
FIGURE 1 is a plan view of the machine.

The drive means for the conveyors 28 and 29 comprises electric motors 112 and 113 at the discharge ends of the conveyors, as indicated in FIGURE 1.

The operation of the machine may be briefly described as follows: The potatoes of mixed sizes enter the machine on the infeed conveyor 1. They fall from this conveyor into the two hoppers 2 and 3 striking the pad 4 and going down the inclined walls 2a and 3a of the conveyors 6 and 7 respectively. These conveyors carry the potatoes to the elevating conveyors 8 and 9 which deposit them upon the cones 16 and 17. Any dirt or trash that is loosened from the potatoes will drop through the fingers of the elevating conveyors.

On the cones 16 and 17 the potatoes are first moved up along the inside of the barriers 18 and 19 toward the cone centers. Then they tend to roll on the cones as the barriers recede from the cone centers. On the cones the potatoes are oriented with their longer axes extending in the direction of travel and they are spread out endwise so that when they leave the cones and engage the conveyors 28 and 29 they are spaced apart on these conveyors with their long axes lengthwise of these conveyors.

If by accident two or three potatoes arrive on the conveyor 28 or 29 in overlapped position, or, if an extra large potato is fed upon such conveyor the first selecting station 68 will actuate its member 79 or 86. This will knock a large potato or two small overlapped potatoes, or the mid one of three overlapped potatoes off the conveyor and back into the respective hopper below. The other potatoes continue past the second selecting station 69 where the largest size of potato that could pass station 68 is picked out and deposited on the cross conveyor 89. The station 70 will take out the next smaller size of potato and deposit it upon the cross conveyor 90 and so on. Only the potatoes that are too small to be selected and removed at station 73 stay on the conveyors to the end. They are deposited in the container 111.

The particular sizing depends upon the patterns of the apertures in the housings 74a of the units 74. For larger size selection this pattern must be larger. These patterns may be selected to sort many articles of varying size as will be readily apparent.

Having described my invention, I claim:

1. A sorting machine for separating various articles of produce according to size comprising:
    an infeed conveyor;
    a pair of hoppers positioned side by side beneath the discharge end of said conveyor for receiving the articles of produce, said hoppers having conveyor bottoms;
    elevating conveyors receiving the articles from the conveyor bottoms of said hoppers, said elevating conveyor embodying spaced elevating fingers operable to lift the articles and leave behind dirt, etc., loosened from the articles and a discharge spout;
    a spacing and aligning cone assembly for each spout positioned to receive articles therefrom and embodying a rotating cone and barrier means over the cone operable to keep articles from rolling off the cone;
    said barrier means being eccentric to the cone with its point of closest approach to the cone apex being across the cone from the point of deposit of articles from the spout upon the cone;
    a sorting conveyor for each cone assembly positioned to receive articles from that cone assembly at a point circumferentially spaced from said point of closest approach of the barrier means;
    each sorting conveyor embodying means at stations spaced along the conveyor operable to remove articles progressively therefrom according to size of the articles;
    and conveyor means at each station for carrying the removed articles away.

2. The invention defined in claim 1 wherein the first station along each sorting conveyor is positioned above one of said hoppers to return the articles removed therefrom to the hopper.

3. In a sorting machine for separating various articles of produce according to size, a hopper;
    a spacing and aligning cone assembly embodying a cone, means supporting the cone for rotation upon an upright axis and upright barrier means over the cone operable to prevent articles delivered on to the cone from rolling off the cone;
    means to deliver the articles from the hopper on to the cone near the periphery thereof between the barrier means and the apex of the cone;
    said barrier means being eccentric to the cone with its point of closest approach to the cone apex being spaced circumferentially of the cone from the point of delivery of the articles on to the cone; and
    a sorting conveyor having a portion thereof juxtaposed to the cone periphery at a point spaced circumferentially of the cone from said point of closest approach to receive articles from the cone;
    said barrier means receding from the cone apex from said point of closest approach to and across said conveyor portion whereby to guide the articles on the cone to said conveyor.

4. The invention defined in claim 3 wherein resilient support means yieldingly supports the barrier means above the cone surface.

5. In a sorting machine for separating various articles of produce according to size, a hopper;
    a spacing and aligning cone assembly embodying a cone, means supporting the cone for rotation upon an upright axis and upright barrier means over the cone operable to prevent articles delivered on to the cone from rolling off the cone;
    means to deliver the articles from the hopper on to the cone near the periphery thereof between the barrier means and the apex of the cone;
    said barrier means being eccentric to the cone with its point of closest approach to the cone apex being spaced circumferentially of the cone from the point of delivery of the articles on to the cone;
    a sorting conveyor having a portion thereof juxtaposed to the cone periphery at a point spaced circumferentially of the cone from said point of closest approach to receive articles from the cone;
    said barrier means receding from the cone apex from said point of closest approach to and across said conveyor portion whereby to guide the articles on the cone to said conveyor;
    said conveyor extending over said hopper;
    and means alongside said conveyor above said hopper actuated by the passage of articles covering more than a predetermined length along the conveyor to push the over long articles transversely off the conveyor into the hopper.

6. In a sorting machine for separating various articles of produce according to size, a hopper;
- a spacing and aligning cone assembly embodying a cone, means supporting the cone for rotation upon an upright axis and upright barrier means over the cone operable to prevent articles delivered on to the cone from rolling off the cone;
- means to deliver the articles from the hopper on to the cone near the periphery thereof between the barrier means and the apex of the cone;
- said barrier means being eccentric to the cone with its point of closest approach to the cone apex being spaced circumferentially of the cone from the point of delivery of the articles on to the cone;
- a sorting conveyor having a portion thereof juxtaposed to the cone periphery at a point spaced circumferentially of the cone from said point of closest approach to receive articles from the cone;
- said barrier means receding from the cone apex from said point of closest approach to receive articles from the cone;
- means alongside said conveyor for detecting the presence of overlapped articles on the conveyor;
- and means actuated by said detecting means to return at least one of the overlapped articles to the hopper.

References Cited by the Examiner

UNITED STATES PATENTS

| | | | |
|---|---|---|---|
| 1,326,117 | 12/19 | Thomas | 209—86 |
| 2,033,645 | 3/36 | Parkhill | 209—82 |
| 2,313,051 | 3/43 | Cutler | 209—73 X |
| 2,997,325 | 8/61 | Peterson. | |
| 3,049,215 | 8/62 | Hutter | 198—30 |
| 3,091,333 | 5/63 | Blake | 209—11.7 X |
| 3,133,624 | 5/64 | Craig | 198—40 |

M. HENSON WOOD, Jr., *Primary Examiner.*

ROBERT B. REEVES, *Examiner.*